United States Patent
Khamizov et al.

[19]

[11] Patent Number: 5,814,224
[45] Date of Patent: Sep. 29, 1998

[54] METHOD FOR COMPLEX PROCESSING OF SEA-WATER

[75] Inventors: Ruslan Khazhsetovich Khamizov; Boris Fedorovich Myasoedov; Boris Antonovich Rudenko; Larisa Ivanovna Mironova; Evgeny Gennadievich Abramov; Olga Vladimirovna Fokina; Eduard Grigorievich Novitsky; Vladimir Pavlovich Vasilevsky; Semen Ilich Gdalin; Valery Davydovich Chernyaev; Mikhail Ekhilievich Shvarts; Alexandr Sergeevich Dzhardzhimanov; Anatoly Nikolaevich Dmitrievsky; Kaplan Saferbievich Basniev; Jury Anatolievich Rakhmanin, all of Moscow, U.S.S.R.

[73] Assignees: Institut Geokhimii I Analiticheskoi Khimii IM.V.I.Vernadskogo Ran (Geokhi Ran); Aktsionernaya Kompania Po Transportu Nefti "Transneft"; Aktsionernoe Osbchestvo "Nauchno-Teknicheskaya Korporatsia" Chistaya Vode; Gosudarstvennaya Akademia Nefti Gaza IM. I.M.Gubkina, all of Moscow, U.S.S.R.

[21] Appl. No.: 695,695

[22] Filed: Aug. 12, 1996

[51] Int. Cl.[6] .................................................. C02F 9/00
[52] U.S. Cl. .................. 210/638; 210/664; 210/669; 210/677; 210/685; 210/687
[58] Field of Search .................. 210/638, 664, 210/669, 670, 677, 679, 685, 687, 747, 748, 640

[56] References Cited

U.S. PATENT DOCUMENTS

| | | | |
|---|---|---|---|
| 4,161,445 | 7/1979 | Coillet | 210/669 |
| 4,911,835 | 3/1990 | Ishii et al. | 210/747 |
| 5,512,178 | 4/1996 | Dempo | 210/669 |

FOREIGN PATENT DOCUMENTS 2006476  1/1994  U.S.S.R. .

OTHER PUBLICATIONS

Horne, R.A. "Marine Chemistry: The Structure of Water . . . " Wiley–Interscience, 1969, pp. 444–454.
Khamizov, R., et al. "Recovery of Valuable Mineral . . . " Ion Exhchange & Solvent Extraction. A Series of Advances, vol. 12, pp. 93–101, 108–111, 136–137.
Madani, A.A. "Zero–Discharge Direct–Contact . . . " Desalination, 85 (1992) pp. 179–195.

Primary Examiner—Ivars Cintins
Attorney, Agent, or Firm—Ladas & Parry

[57] ABSTRACT

A method for complex procesing of sea-water comprises the successive steps of mechanical filtration, calcium separation on modified zeolite, magnesium separation on weak-acid cation exchanger and processing of the resulting softened sea-water, regeneration of the modified zeolite and regeneration of the weak-acid cation exchanger. During the step of processing of the softened sea-water, its desalination it carried out so as to produce fresh water and simulatneously produce secondary brine having a concentration of salts at least as high as 100 g/l whereby the modified zeolite is regenerated. A plant for implemention of the method of complex processing of sea-water comprises a filter, two sorption columns for calcium separation connected in parallel with each other, a sorption unit for magnesium separation, a softened sea-water processing unit and a mixed concentrate processing unit.

24 Claims, 5 Drawing Sheets

METHOD FOR COMPLEX PROCESSING OF SEA-WATER

FIELD OF THE INVENTION

The invention relates to methods for processing of sea-water and more specifically, concerns a method and a plant for complex processing of sea-water.

The invention can be used for the creation of sea-water desalination stations of new generation and modification of desalination stations for producing fresh water and valuable mineral substances.

DESCRIPTION OF THE PRIOR ART

Methods are known in prior art to be used for processing of sea-water (R. A. Home. Marine Chemistry. New York-London-Sydney-Toronto, "Wiley-Interscience", 1969. pp. 444–454) by distillation, reverse osmosis, electrodialysis, solar desalination as well as freezing crystallization to produce fresh water. During realization of prior art methods, the secondary brines resulting from the production process and containing a large quantity of valuable mineral substances are essentially waste materials which are discharged into the sea aquatorium, thus causing its pollution and worsening of ecology.

A method for processing of sea-water is known in prior art (A. A. Madani, Discharge, Direct-Contact Freezing/Solar Evaporator Desalination Complex, Desalination, v. 85, 1992, pp. 179–195) to consist in that a step of desalination is first carried out which produces fresh water and secondary brines, and then said brines are directed to processing in order to produce salt products.

However, in the above method the step of desalination and the step of processing the secondary brines are essentially independent processes, and this leads, on the one hand, to higher costs of water desalination and, on the other hand, does not allow to produce brines of rather high concentration, which would be profitable in processing.

Another method for processing sea-water is known in prior art (Ruslan Khamizov, Dmitri Muraviev & Abraham Warshavsky. Ion Exchange and Solvent Extraction. A series of Advances, v. 12/ed. J. Marinsky & Y. Marcus, New York-Basel-Hong Kong, "Marcel Dekker, Inc.", pp. 93–101, 109–111, 136–137) to comprise successive steps of separation of calcium, magnesium and bromine salts, desalination resulting in producing secondary sodium brines, and processing the brines to produce sodium salts.

Simultaneously with separating calcium and magnesium salts, the above method ensures sea-water pretreatment for distillation plants of various types, thus enabling to extract more fresh water and improve the brine concentrating factor. The method also allows to avoid formation of hard-to-process brines of mixed type.

However, in implementation of the above method, it is necessary to use at the step of magnesium separation such expensive reagents as alkali, which have their costs commensurable with the costs of magnesium products.

A further method for complex processing of sea-water is known in prior art (SU, A, 2006476) to comprise the following successive steps: mechanical filtration, calcium separation by passing the resulting filtrate through modified zeolite, magnesium separation by passing the resulting solution through a weak-acid cation exchanger and processing the resulting softened sea-water, regeneration of said modified zeolite followed by separation of calcium compounds from the regenerate, and regeneration of said weak-acid cation exchanger by a solution of sodium carbonate followed by spontaneous forming of magnesium carbonate from the regenerate.

However, since sea-water is a reasonably mineralized medium, therefore, the sorbents for presoftening, for instance, zeolites require to be frequently regenerated or, in order to extend the filtering cycles, it is necessary to use large loadings of sorption materials, but this requires some extra expenses to be run up in preparing or purchasing the concentrated salt solution in an amount as required for the regeneration of zeolites, or else purchasing the regents for calcium separation from the regenerating solutions in order to recycle the latter.

One of the shortcomings featured by the above method consists in that the technological process is not completely a closed-circuit process since after the step of processing in the secondary brines to produce sodium salts, liquid effluents are formed which are essentially brines enriched with potassium.

This prior art method does not allow to carry out, during the steps of mechanical filtration and calcium and magnesium separation, also extraction of bromide and boron which, on the one hand, are valuable components and, on the other hand, if being present, they are detrimental to the quality of drinking water produced at the step of desalination.

Also, a plant for complex processing of sea-water is known in prior art (SU,A,2006476) to comprise the following equipment arranged in succession downstream the technological process: a sorption filter with natural zeolite, a vertical sorption column with modified zeolite for separation calcium, a sorption unit with a weak-acid cation exchanger for magnesium separation, a softened water processing unit, and mixed concentrate processing unit.

This prior art plant comprises an expensive unit for regeneration of zeolites used at the step of calcium separation and requires each time large quantities of modified zeolite to be loaded into the sorption column for calcium separation.

During the operation of this plant, it is necessary to break up the process periodically in order to carry out the regeneration in the sorption column at the step of calcium extraction.

SUMMARY OF THE INVENTION.

One object of the present invention is to reduce the cost of the method for complex processing of sea-water by eliminating the necessity of employing purchased reagents at the step of calcium separation from sea-water.

Another object of the invention is to improve ecological safety in complex processing of sea-water owing to the use of a closed-circuit scheme and elimination of liquid effluents.

A third object is to improve efficiency of method for complex processing of sea-water and to make it cheaper due to intensifying the process of magnesium carbonate separation from regeneration solutions and due to extraction of more magnesium at the step of desorption.

In addition to this, it is an object of the invention also to extend the range of components being extracted and more specifically, to ensure extraction of bromine and boron compounds with a simultaneous improvement in quality of desalinated water.

It is a further object of the invention to reduce the cost of a plant for complex processing of sea-water and to improve efficiency of its operation.

The objects thus put forth are solved by a method for complex processing of sea-water, comprising the following successive steps: mechanical filtration, calcium separation by passing the resulting filtrate through modified zeolite, magnesium separation by passing the resulting solution through a weak-acid cation exchanger and processing the resulting softened sea-water, regeneration of said modified zeolite followed by separation of calcium compounds from the regenerate, and regeneration of said weak-acid cation exchanger by a solution of sodium carbonate followed by spontaneous formation of magnesium carbonate from the regenerate. According to the invention, during the step of processing the softened sea-water, its desalination is carried out to produce fresh water and simultaneously produce secondary brine having a concentration of salts at least 100 g/l whereby the modified zeolite is regenerated.

Preferably, the mechanical filtration of sea-water is to be carried out with the use of natural zeolite.

It is advisable to subject regenerate resulting from the step of regeneration of the modified zeolite and including calcium, sodium and potassium salts to evaporation and fractional crystallization with successive separation of calcium and sodium chloride, followed by cooling the resulting brine until sodium sulphate is separated and potassium is produced.

In one of the embodiments it is possible to carry out evaporation and fractional crystallization with the use of solar energy.

Preferably, cooling of the resulting brine is to be carried out until its temperature reaches below 10° C.

It is advisable to pass the potassium brine through zeolite wastes from the step of mechanical filtration to produce zeolite of potassium form and residual brine which is directed to the step of evaporation of said mixed concentrate.

Preferably, fresh natural zeolite is to be added to the zeolite waste resulting from the step of mechanical filtration.

In one of the embodiments, after the step of calcium separation by electrosorption with an anode potential on activated carbon modified by hydroxides of metals, with the activated carbon being regenerated at a cathode potential, followed by processing the regenerate until a concentrate of magnesium bromide is produced, fresh water being passed through activated carbon during its regeneration.

It is advisable to use, as said hydroxides of metals a mixture of at least two hydroxides of the same metal with different states of oxidation and with a smaller potential of reversible electrochemical process of oxidation-reduction between them than the discharge potential of water.

In one of the embodiments, it is further desirable, after the step of magnesium separation, to carry out a step of boron separation by passing softened water through a weak-base anion exchanger in carbonate form.

In so doing, it is preferable to regenerate the weak-base anion exchanger by soda solution, followed by electrolytic separation of sodium perborate.

It is advisable to subject said sodium perborate to filtration and drying to produce solid sodium perborate and filtrate.

It is possible to subject the resulting filtrate to afterstrengthening and then direct it as a regenerating agent to the step of regenerating the weak-base anion exchanger.

It is advisable to carry out the regeneration of said weak-acid cation exchanger at a temperature below the temperature which is maintained at a deposit of magnesium carbonate formation and to subject the magnesium carbonate thus separated to a subsequent filtration and drying to produce solid magnesium carbonate and filtrate.

Preferably, the regeneration on the weak-acid cation exchanger at the step of magnesium separation is to be carried out at a temperature not higher than 25° C., followed by forming a deposit of magnesium carbonate at a temperature not lower than 35° C.

It is possible to subject the filtrate resulting from the separation of magnesium carbonate to afterstrengthening and then direct it as a regenerating agent to the step of regenerating the weak-acid cation exchanger.

In one of the embodiments of the desalination method, it can be carried out by electrodialysis so as to produce a secondary brine having a concentration of salts from 100 to 250 g/l and a diluate directed to a reverse osmosis which results in producing fresh water and an intermediate brine which is subjected to an additional electrodialysis, resulting in production of an additional portion of the secondary brine having a concentration of 100 to 250 g/l and a diluate which is mixed with the diluate resulting from the first step of electrodialysis.

In another embodiment of the method, the step of desalination can be carried out by thermal distillation which is effected so as to produce said secondary brine having a concentration of 100 to 200 g/l and fresh water.

In still another embodiment of the method, it is desirable to carry out the step of desalination by membrane distillation which is effected so as to produce the secondary brine having concentration of 100 to 300 g/l and fresh water.

The problem thus put forth is solved also by (the objects are accomplished also by) a plant for complex processing of sea-water according to the invention, comprising the following equipment arranged in succession downstream the technological process: a sorption filter with natural zeolite, a vertical sorption column with modified zeolite for calcium separation, a sorption unit with a weak-acid cation exchanger for magnesium separation, a softened water processing unit, and a mixed concentrate processing unit, according to the invention, further comprises a sorption column for calcium separation connected in parallel with the first column for calcium separation, said columns being provided with assemblies having inlet and outlet valves and disposed at the top and bottom portions thereof, the softened water processing unit is made as a desalinating module having an inlet and two outlets for fresh water and secondary brine, respectively, wherein the outlet of the sorption filter is connected to the inlet valves of the assemblies at the top portions of the sorption column for calcium separation, the inlet of sorption column for magnesium separation is connected to the outlet valves of the assemblies at the bottom portions of the sorption columns for calcium separation, the outlet for the secondary brine flowing from the desalinating module is connected to the inlet valves of the assemblies at the bottom portions of the sorption columns for calcium separation, and the inlet of mixed concentrate processing unit is connected to the outlet valves of the assemblies at the top portions of the sorption columns for calcium separation.

It is advisable to provide the plant with additional column with natural zeolite, which has the inlet thereof connected to the outlet of the mixed concentrate processing unit, whereas the outlet of said column is connected to the inlet of mixed concentrate processing unit.

The method for complex processing of sea-water, when implemented in accordance with the present invention, ensures:

improved ecological safety in complex processing of sea-water owning to the use of a closed-circuit scheme and elimination of liquid effluents;

improved efficiency of complex processing of sea-water and making it cheaper due to intensifying the process of magnesium carbonate separation from regeneration solutions and owing to extraction of more magnesium at the step of desorption;

involvement of bromine and boron compounds in the range of components being extracted with a simultaneous improvement in quality of desalinated water and ensuring high efficiency of extraction as well as a reduction of gas emission in the process of extraction.

BRIEF DESCRIPTION OF THE DRAWINGS

Hereinafter the invention will be described in more detail with reference to the accompanying drawings illustrating specific embodiments thereof, in which.

DETAILED DESCRIPTION OF THE INVENTION

Figure 1:
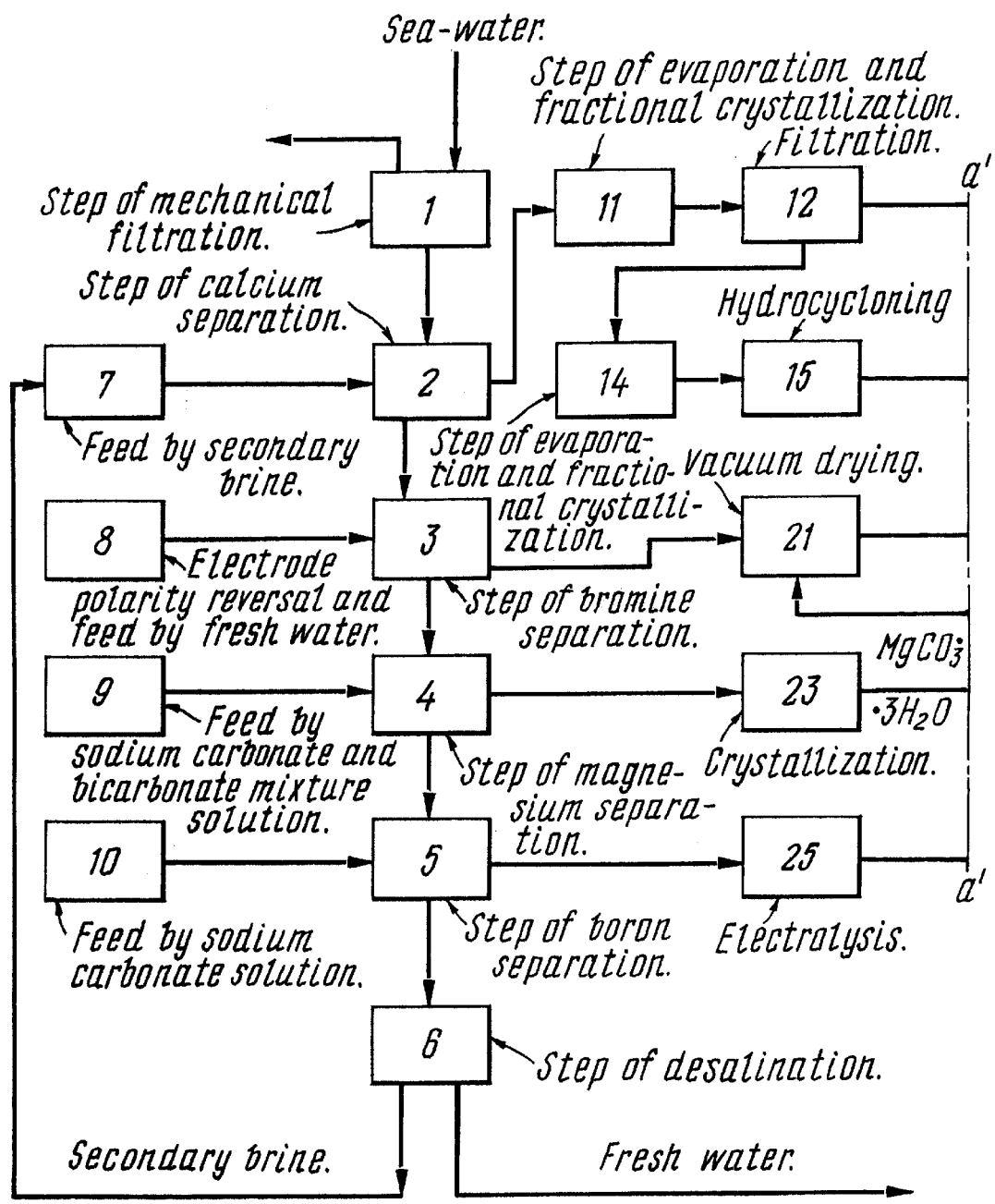
FIG. 1 and 1a shows schematically the succession of steps featured by the complex processing of sea-water in accordance with the method taught by the invention.
Figure 1A:
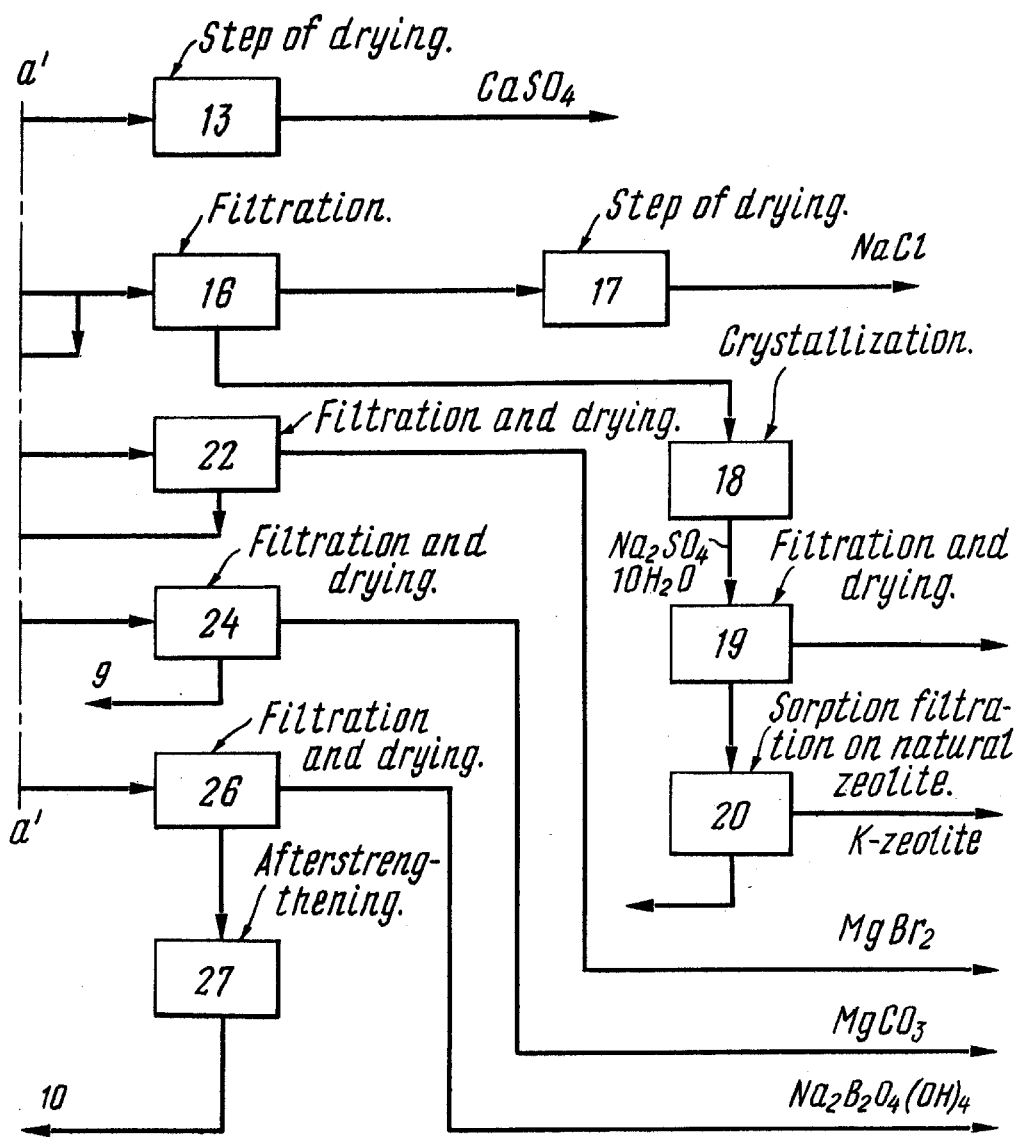

The method for complex processing of sea-water, the succession of steps for which is shown schematically in FIG. 1, according to the invention, consists in the following.

Sea-water to be processed is subjected to successive treatment at the step 1 of mechanical filtration by pumping it through a sorption filter with natural zeolite in $Na^+$ form, step 2 of calcium separation from the filtrate on modified artificial zeolite in $Na^-$ form, step 3 of bromide separation in electrosorption apparatus charged with modified activated carbon with an admixture of hydroxides of metals, step 4 of magnesium separation on a weak-acid carboxylic cation exchanger, step 5 of boron separation on a weak-base anion exchanger in $CO^{2-}$ form and step 6 of desalination so that fresh water is produced therefrom.

At the step 1 of mechanical filtration, simultaneous purification of sea-water takes place so as to remove ions of iron and ions of nonferrous and heavy metals as well as to remove partially calcium therefrom.

At the step 2, complete separation of calcium from sea-water takes place on modified artificial zeolite.

Then, the sea-water made complexity free from calcium enters the step 3 where electrosorption selective oxidation of $Br^-$ to $Br_2$ and sorption of bromine on activated carbon take place in the anode chamber of the electroadsorber, and also formation and deposition of some magnesium in the form of magnesium hydroxide take place in the cathode chamber of the electroadsorber.

At the step 4, ion-exchange extraction of magnesium takes place on a carboxylic cation exchanger with a degree of extraction from 90 to 95%.

The sea-water which is already made essentially complexity free from magnesium and by 70 to 80% free from bromides, enters the step 5, where extraction of boron takes place by 70 to 80%.

The softened sea-water having no calcium, magnesium, bromine and boron and representing a solution of sodium chloride and sulphate with an admixture of potassium chloride and sulphate enters the step 6 of desalination.

Fresh water having a concentration of salts not more than 0.5 g/l is fed further on to a conditioning system where it is brought up to the quality of commercial drinking water.

Regeneration of modified zeolite at the step 2 is carried out while ensuring the step 7 of feed of secondary brine having a concentration of at least 100 g/l, from the step 6 of desalination.

Regeneration of activated carbon at the step 3 is carried out while effecting simultaneously the step 8 of electrode polarity reversal and simultaneously feed of fresh water. In so doing, a liquid concentrate of $MgBr_2 \cdot 6H_2O$ is produced.

Regeneration of the carboxylic cation exchanger at the step 4 is carried out while ensuring the step 9 of feed of sodium carbonate and bicarbonate mixture solution at a temperature not higher than 25° C. so as to produce a concentrate-supersaturated solution of magnesium carbonate in sodium carbonate.

Regeneration of weak-base anion exchanger at the step 5 is carried out while ensuring, the step 10 of feed of concentrated sodium carbonate solution so as to produce a boron concentrate. The mixed concentrate resulting from the step 2 after regeneration of modified zeolite enters on the step 11 of evaporation and fractional crystallization until saturation with sodium chloride is reached, the suspension of calcium sulphate thus produced is fed to the step 12 of filtration, whereupon the moist deposit enters the step 13 of drying so as to produce a commodity product, whereas the filtrate is directed to the next step 14 of evaporation and fractional crystallization so as to produce a suspension of sodium chloride and then to the step 15 of hydrocycloning with a return of the saturated brine to the step 14, whereas the saturated suspension of sodium chloride is directed to the step 16 of filtration. The moist deposit of NaCl is fed to the step 17 of drying so as to produce a commodity product. The filtrate (sulphate brine) resulting from the step 16 and enriched with sodium sulphate is fed to the step 18 of crystallization where at a temperature not higher than 10° crystallization of sodium sulphate in the form of $Na_2SO_4 10 H_2$ takes place, and then it is fed to the step 19 of filtration and drying so as to produce a commodity product-sodium sulphate. The filtrate resulting from the step 19—potassium brine—is fed to the step 20 of sorption filtration on zeolite wastes resulting from the step 1 of mechanical filtration with an addition of fresh natural zeolite where selective absorption of potassium and production of potassium—saturated zeolite as a commodity product take place, which product can be used as a chlorine-free fertilizer of prolonged action. The residual brines resulting from the step 20, being a mixture of sodium chloride and sulphate are directed back to the step 11 of evaporation and fractional crystallization. The concentrate of magnesium bromide resulting from the step 13 is directed to the step 21 of vacuum drying and then to the step 22 of filtration and drying so as to produce a commodity product—NgBr$_2$6H$_2$O. The filtrate resulting from the step 22 is returned to the step 21 of vacuum drying.

The concentrate—supersaturated solution of MgCO$_3$ in Na$_2$CO$_3$—resulting from regeneration of the carboxylic cation exchanger is fed to the step 23 of crystallization where at a temperature not lower than 35° spontaneous crystallization of magnesium carbonate in the form of MgCO$_3$.3H$_2$O takes place.

The resulting suspension is subjected then to filtration and drying at the step 24 so as to produce a commodity product, MgCO$_3$, having a purity of at least 99.5% as sell as a filtrate which is afterstrengthened and returned to the step 9.

The concentrate of boron resulting from the step 5 is fed to the step 25 of electrolysis where formation of sodium perborate takes place with a simultaneous precipitation thereof The suspension is filtered and dried at the step 26 so as to produce a commodity product—sodium perborate Na$_2$B$_2$O$_4$(OH)$_4$. The filtrate, upon treatment (afterstrengthening) thereof at the step 27 is returned to the step 10.

Figure 2:
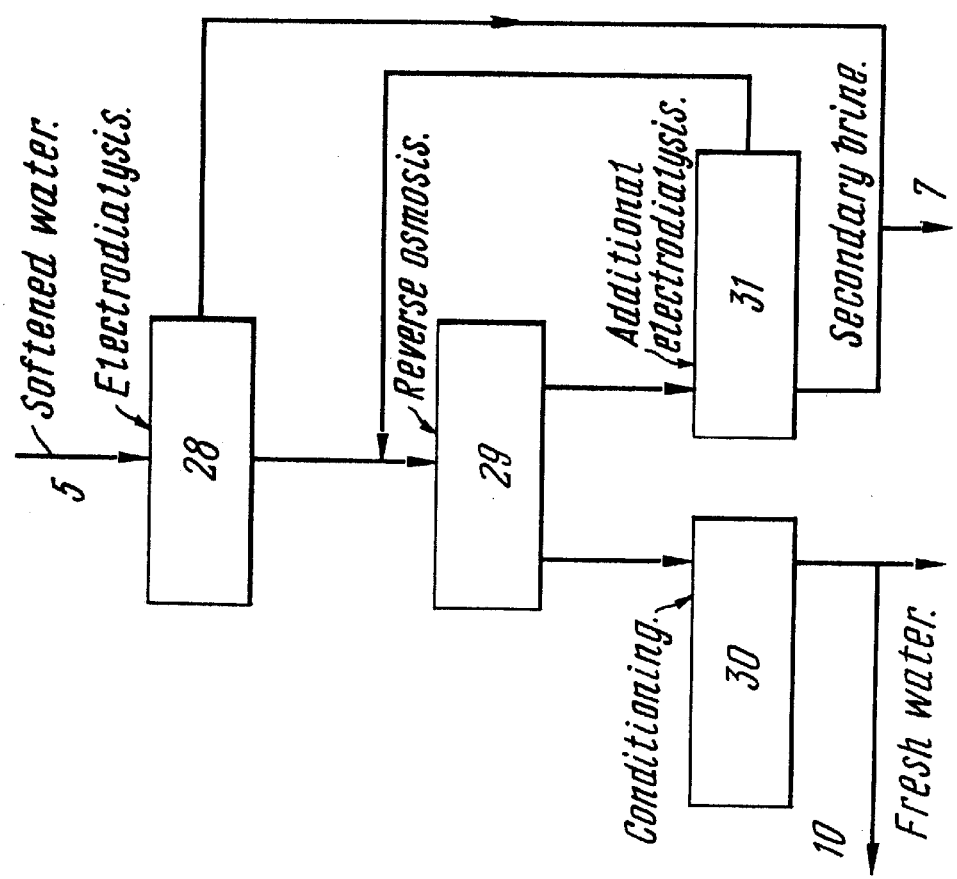
FIG. 2 is a scheme of the first embodiment of desalination step.

The step 6 of softened sea-water desalination can be carried out in several ways. The first probable embodiment of this step is shown schematically in FIG. 2.

According to this embodiment, the softened sea-water after step 5 (FIG. 1) enters the step 28 (FIG. 2) of electrodialysis which results in forming secondary brine having a concentration of salts up to 250 g/l, which is fed to the step 7 (FIG. 1) for further processing thereof into dry sodium salts and diluate representing slightly mineralized solution of sodium and potassium salts having a total concentration of 5 g/l, which is then fed to the step 29 (FIG. 2) of reverse osmosis. Step 29 produces fresh water having a concentration of salts not higher than 0.5 g/l, which is directed to the step 30 of conditioning so as to produce a commodity product—drinking water—and an intermediate brine having a concentration up to 12 g/l, which is fed to the step 31 of additional electrodialysis after which a secondary brine is formed with a concentration of salts up to 200 g/l, which is fed to the step 7 (FIG. 1) together with the secondary brine resulting from the step 28 (FIG. 2), and also a diluate is formed with a concentration of salts as low as 2.5 g/l, which is mixed with the diluate resulting from the main step 28 of primary electrodialysis and returned to the step 29 of reverse osmosis.

The step 31 of additional electrodialysis is carried out at a lower voltage of electric current and with the use of an apparatus having a simpler design and comprising a similar number of desalination chambers all other things being equal as compared against the step 28 of primary electrodialysis.

Owing to the fact that deeply softened sea-water enters the step 28 of electrodialysis from the step 5 (FIG. 1), intermediate brines formed from this water are retained in the electrodialyzer down to producing secondary brine having a concentration of up to 250 g/l without any danger of scaling on the membranes. In the process of retaining, the voltage of electric current and temperature should be under control since an increase in voltage rises efficiency of desalination but, on the other hand, rises at the same time also the temperature, thus reducing the concentration threshold dangerous from the viewpoint of scaling.

Another embodiment of the step of desalination shown schematically in FIG. 3 consists in the following.

Figure 3:
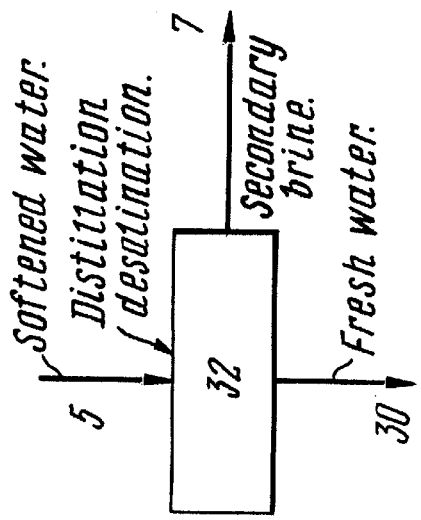
FIG. 3 is a scheme of the second embodiment of desalination steps.

The softened sea-water after the step 5 (FIG. 1) enters the step 32 (FIG. 3) of disstillatiopn desalination where it is subjected to distillation in multibody evaporators or multistage adiabatic plants (multistage flash-MSF) or thin-film tubular evaporators (multiple effect distillation—MED) and is retained in them so as to produce secondary brine (blowdown brine) with a concentration of salts up to 200 g/l, which is then fed to the step 7 (FIG. 1), and fresh water having a concentration of salts not higher than 0.2 g/l, which is then fed to the step of conditioning (not shown in FIG. 3).

When the concentration of salts is higher than 200 g/l, films of saturated NaCl solution may form in the vicinity of the heat exchanger walls, and even well-soluble compounds may then precipitate.

In order to ensure a predetermined concentration in multibody evaporators or MSF, desalination depth and concentrating factor are maintained at each step by adjusting temperature and pressure, at a level ensuring concentration of secondary brine at the outlet from the desalinator up to 150 or 200 g/l for each said types of apparatus, respectively. During desalination on MED, intermediate brines are repeatedly returned to certain steps of the evaporator, with temperature, pressure and feed rate thereof being maintained as required, until secondary brine having a concentration of salts up to 200 g/l is produced at the outlet.

Figure 4:
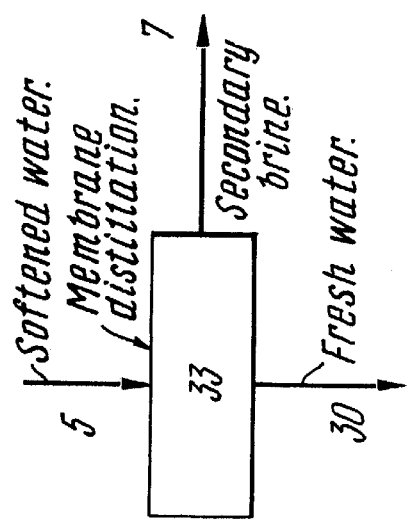
FIG. 4 is a scheme of the third embodiment of desalination step.

The third embodiment of the desalination step shown schematically in FIG. 4 is effected as follows.

The softened sea-water after the step 5 (FIG. 1) enters the step 33 (FIG. 4) of membrane distillation where under the influence of a temperature gradient from 20° to 60° C. the over-water vapors in the hot chamber are continuously passes through a hydrophobic membrane into the cold chamber where they condense as fresh water with a concentration of salts not higher than 001 g/l, which is then fed to the step of conditioning (not shown in FIG. 4) to produce a commodity product—drinking water. In this case, secondary brine is formed in the hot chamber, which has a concentration of salts from 200 to 300 g/l and is then fed to the step 7 (FIG. 1) in order to be processed there farther so that commodity products—dry sodium salts—are produced.

It is not advisable to increase the concentration of sat higher than 300 g/l since NaCl may then precipitate on the membrane at a temperature of 60° C.

The above-mentioned concentration of salts is ensured by adjusting temperature and pressure in the chambers so as to take account of the area selected for the hydrophobic membranes.

The method for complex processing of sea-water, according to the present invention, provides "self-regenerating" sorption-desalination systems due to combining the following conditions: use of modified zeolites and use of the isothermal supersaturation effect for their regeneration. To be understood under the term "self-regenerating" system should be that in the technological process including sorption and desalination steps, regeneration of sorbent is carried only with the use of brines produced during the process per se. The result attainable thereby consists in that conditions are created under which the quantity of secondary brines produced in a single cycle from softened sea-water appears to be sufficient for complete regeneration of zeolites with simultaneous separation of calcium salts. For instance, if V$_o$ of the sea water volume is softened in the sorption cycle, and the concentrating degree of secondary brines is equal to P, then the volume of the latter equal to V=V$_o$/P ensures the possibility of exhaustive desorption of calcium from zeolite and regeneration of it to its sodium form to be used in a next softening cycle. Zeolites are modified as follows. Artificial zeolites are successively treated 0.05 to 0.5M solution of magnesium chloride until saturation is reached and with 2 to 3M solution of sodium chloride. The modified zeolites possess a combination of properties necessary for efficient sorption pretreatment: high value of selectivity coefficient for ion exchange of calcium and magnesium ions $\alpha_{Mg}^{Ca} \geq 25$, low value of equilibrium constant for ion exchange of calcium and sodium, $K_{Na}^{Ca} \approx 1$, and high value of total exchange capacity 5 g-eq/l.

Figure 6:
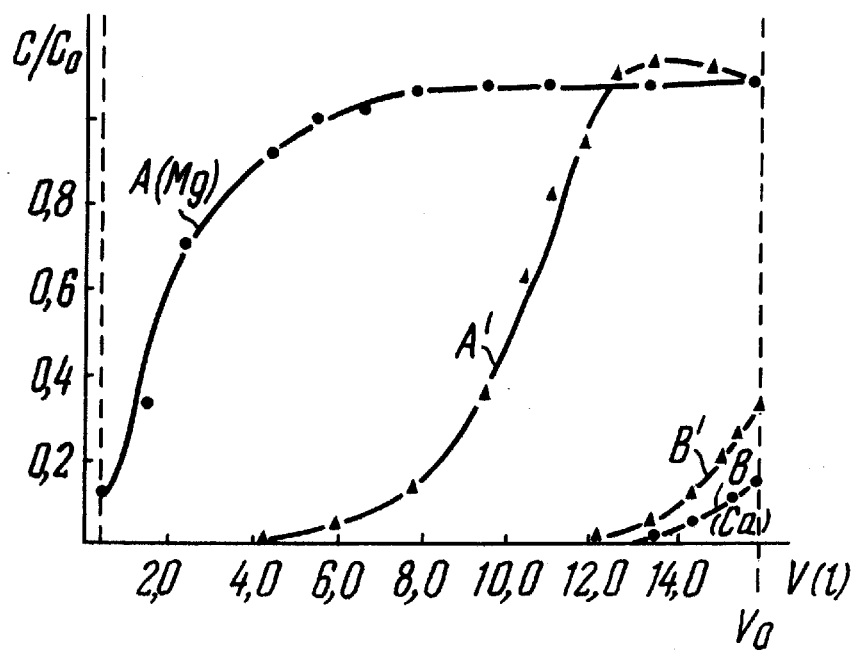
FIG. 6 are yield break-through curves of sorption on artificial modified zeolite, where plotted on the ordinate are values of calcium and magnesium ion concentration in the solution as related respective concentrations in the source sea-water and plotted on abscissa is the volume of solution passed through modified zeolite, in liters.
Figure 7:
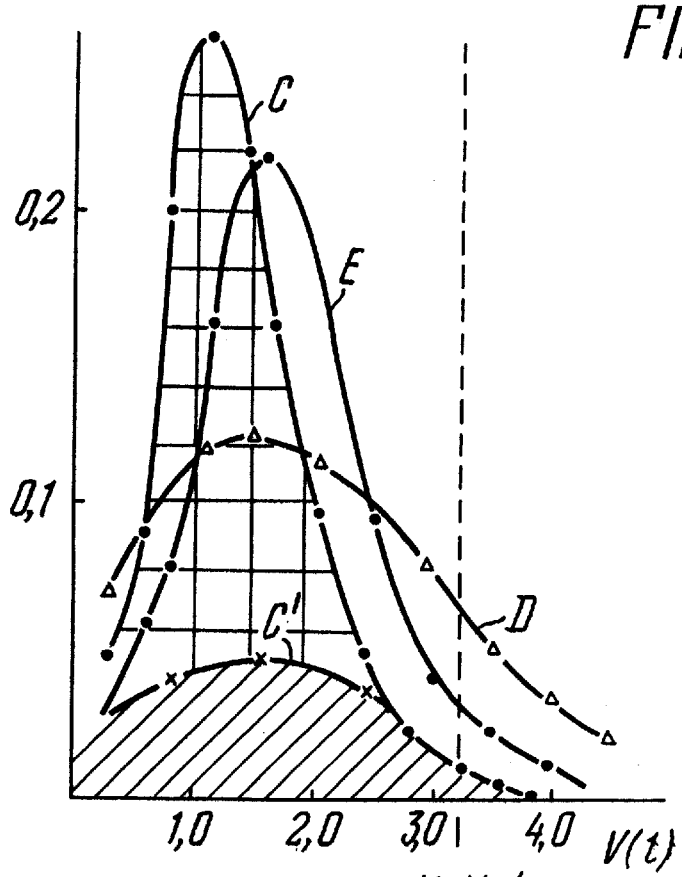
FIG. 7 are yield break-through of modified zeolite regeneration, where plotted on the ordinate are the values of magnesium ion concentration in the solution, and plotted on abscissa is the volume of solution passed in liters.

The supersaturation effect allows to use the secondary brine resulting from desalination of sea-water and being a mixture of sodium chloride and sulfating, without precipitation of gypsum in the zeolite bed. At the same time, efficiency of regeneration increases, and complete desorption of calcium is attainable with the volume of concentrate equal to $V_o/P$. The necessity of combining the above-mentioned factors—use of modified zeolites and ion-exchange supersaturation effect—is illustrated in FIGS. 6 and 7. In FIG. 6 which shows break-through curves of sorption for magnesium (A and $A^1$) and calcium (B and $B^1$) from sea-water on 0.8 lt of modified zeolite (curves A and B) as compared with the same quantity of industrial-grade sulfonic cation exchanger of Dowex-50 - type (curves A' and B'), it can be seen that these sorbents are practically equivalent to each other as far as sorption of calcium is connected. At the same time, as seen from FIG. 7, exhaustive regeneration of modified zeolite (curve C) is attained using 3.2 liters of chloride-sulphate secondary brine (resulting from 5-fold concentration of 16 liters of softened water in accordance with FIG. 6) having a concentration of 175 g/l, and the supersaturated solution thus produced is spontaneously decomposed with a residual concentration of calcium in the solution being accordance with curve C'. As shown by curve D, the same quantity of the same secondary brine is unable to regenerate the sulfonic cation exchanger. As shown by curve E, the same quantity of pure chloride solution having a concentration not leading to supersaturation is unable to regenerate modified zeolite. It is advisable to use secondary brine having a concentration of at least 100 g/l in carrying out the process of regeneration of modified zeolite since at lower concentrations the efficiency of regeneration decreases and the quantity of brine produced in a single softening-desalination cycle is not sufficient for exhaustive desorption of calcium. Traditional technologies of desalination do not allow to produce secondary brines having a concentration higher than 60 to 90 g/l. The method now claimed, due to deep softening, allows to increase the concentration degree and, respectively, efficiency of desalination.

In the method now claimed, bromine is extracted by an electrosorption method with the use of activated carbon as sorbent and a three-dimensional electrode.

In this case, the use is made of activated carbon having a small quantity of mixture of substances immobilized on its surface: $Me(OH)_x + Me(OH)_y$, for instance, a mixture of ferrous hydroxide (II) and ferric hydroxide (III), chromous hydroxides (II) and (III) or titanium hydroxides (II) and (IV). By a notion of hydroxides in this specification are meant both chemically true hydroxides and hydroxided oxides of metals, In this case, the process of bromine extraction is realized due to functioning of a conjugated electrochemical pair $2Br^- \leftrightarrow Br_2$ and $Me^{x+} \leftrightarrow Me^{y+}$.

At the sorption stage, for instance, when ferric and ferrous hydroxides are used:

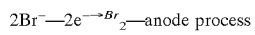—anode process $Mg^{2+}+Fe(OH)_3+2e^- \rightarrow Mg(OH)_2+2Fe(OH)_2$—cathode process at the desorption stage

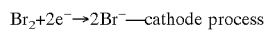—cathode process

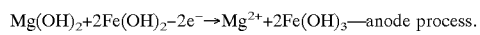—anode process.

The gain in voltages (electric power consumed) owning to standard potentials of half-reactions makes up a value in order of 1.23 V per sorption-regeneration cycle. This is manifested qualitatively as elimination from the process, of a more power-intensive auxiliary reaction of water discharge due to a less power-intensive reaction of solid-phase transition $Fe^{2+} \rightarrow Fe^{3+}$ and, in so doing, the necessity is kinetically eliminated for diffusion transport of ions $H^+$ and $OH^-$ from the cathode to the anode and vice versa, and no oxidation of activated carbon matrix takes therewith place.

A substantial particularity of the method now claimed as compared against the closest prior art at the step of separation of magnesium from water being processed and production of a solid product in the form of magnesium consists in implementing the processes of desorption of magnesium from a cation exchanger and crystallization of magnesium carbonate from supersaturated solution in the resulting concentrate at different temperatures.

It was found out that the process of decomposition of the super-saturated solution accelerates substantially with an increase of temperature. It is advisable to use a temperature of at least 35° C. since at a lower temperature the effect attainable in comparison with the closest prior art is negligible.

At the same time, the process of magnesium desorption with recycled regeneration solution of sodium carbonates (after separation of magnesium carbonates) goes on less efficiently with in increase of temperature so that it is, therefore, advisable to cool the regeneration solution prior to feeding it to the next cycle of regeneration, down to a temperature not higher than 25° C.

An advantage of the method, according to the invention, resides in that separation of boron is effected by sorption on weak-base anion exchangers without using, in doing so, acids and alkalis as regenerating agents.

An essential particularity of desalination step consists in the claimed scheme combining electrodialysis with reverse osmosis, wherein efficiency of the process and productivity of the reverse-osmotic processing of softened sea-water are increased due to the use of an additional electrodialyzer having, its technological parameters different from the parameters of the main electrodialyzer. This allows to return intermediate brine after the step 29 (FIG. 2) of reverse osmosis back to the step 31 of auxiliary electrodialysis without a change in the modes of electrodialysis treatment of the mean flow of softened sea-water as well as to dilute the diluate resulting from the step 28 of main electrodialysis, which enters the step of reverse osmosis, by a more diluted diluate resulting from the step 31 of additional electrodialysis, wherein the productivity of the latter step can be many times as small as the productivity as the step 28 of main electrodialysis, and this allows, when combining the concentrates resulting from both steps, to avoid a substantial reduction in concentration of sodium salts, i.e. a reduction in the technological quality of secondary brines.

An advantage resides also in that at the desalination step combined with the processes of deep softening of sea-water due to extraction of calcium and magnesium and also iron impurities, the desalination methods of prior art knowledge, such as the methods of thermal distillation or membrane distillation, can be used with a higher productivity and higher efficiency as far as the degree of fresh water extraction and the concentration degree of secondary brines are concerned.

In the known methods of thermal distillation, the concentration degree of the resulting secondary brines is 2.5. Any further concentration leads to spontaneous precipitation of calcium sulphate and carbonate as well as magnesium hydroxide which deposit on the heat-exchanging surfaces.

In the method, according to the invention, the concentration degree can be reached that is equal to 3–9.

A substantial particularity of the method, according to the invention consists in utilization, at the mixed concentrate processing step, of potassium brines resulting from separation of sodium chloride and sodium sulphate, by passing them through natural zeolites to potassium, the zeolites change over to potassium form and can be used in the future as a chlorine-free potassium mineral fertilizer of full value. The solution of sodium salt passed through zeolite can be returned back to the step of evaporation and fractional crystallization of the mixed concentrate. Thus, the use of zeolite at the tail of the process for separation of potassium from residual brines has allowed to create a closed-circuit wasteless system for complex processing of sea-water.

A substantial particularity of the entire scheme in the proposed method for complex processing of sea-water, in distinction to those known in prior art, consists in combining and interrelating all the steps of the process, which thus ensure the possibility of efficient running of the process as a whole: pretreatment and softening of sea-water with extraction of calcium and magnesium improve productivity of the desalination process, ensure the possibility of concentrating therewith the secondary brines to a high degree, and this is its turn allows to carry out regeneration of sorbents and profitable processing of the regenerates into pure sodium and calcium salts.

Extraction of bromine and boron at the desalination step allows to ensure high quality of fresh water and makes it possible to condition it up to the quality of drinking water.

Fresh waters and residual brines produced at the steps of desalination and processing of secondary brines can be partially used for providing the steps of calcium, magnesium, bromine and boron extraction with necessary reagents and solutions. Separation of potassium at the last step allows to create an ecologically safe closed-circuit complex system. The secondary heat after the step of desalination can be utilized in order to ensure the necessary heat conditions for carrying out the processes of separation of salts at the previous steps.

Figure 5:
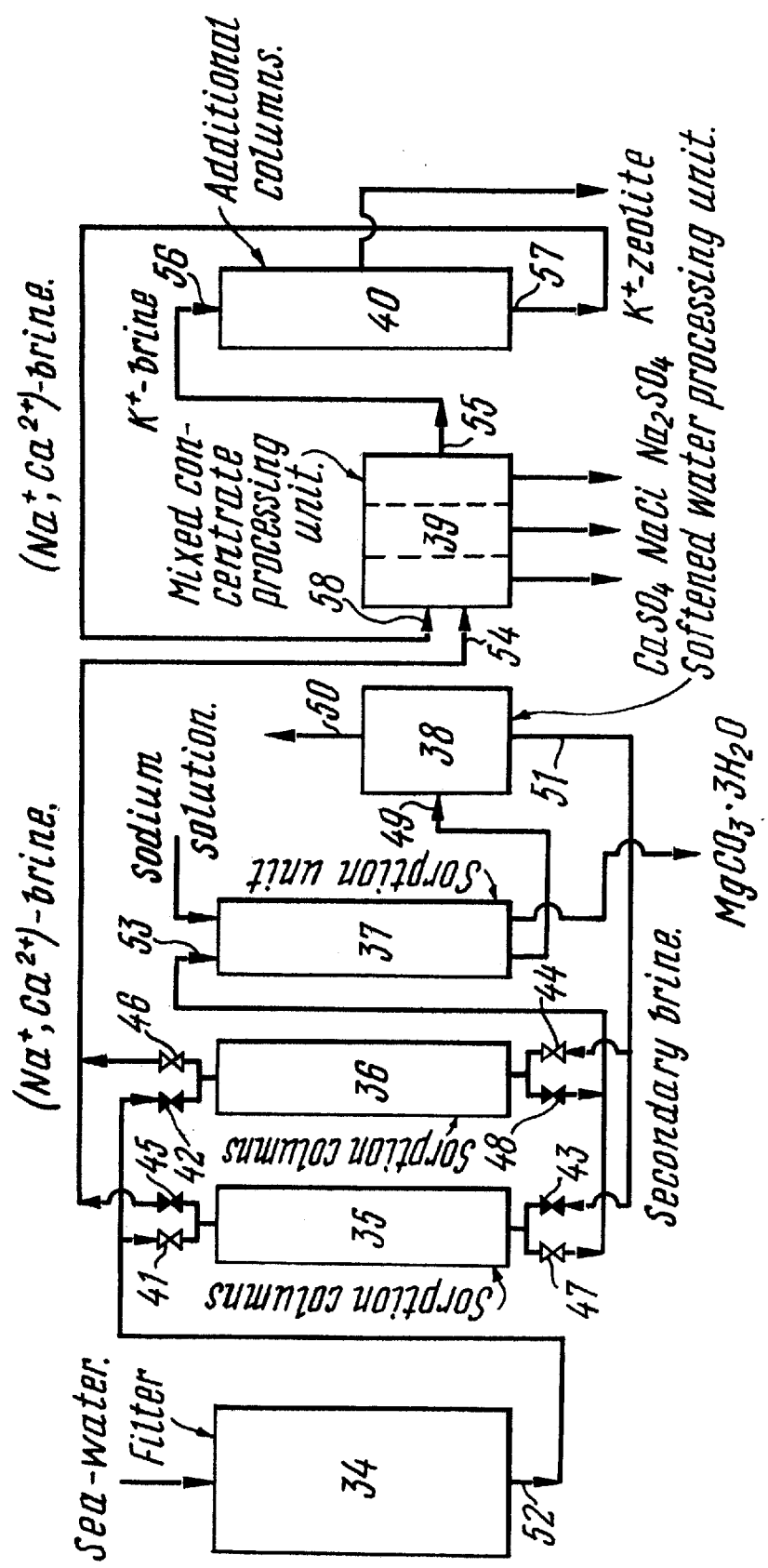
FIG. 5 shows schematically a plant for complex processing of sea-water, according to the invention.

FIG. 5 shows schematically a plant for complex processing of sea-water, intended for realization of the method, according to the invention.

The plant for complex processing of sea-water comprises the following equipment arranged in succession downstream the technological process; a filter 34 with natural zeolite, two vertical sorption columns 35 and 36 for calcium separation charged with modified zeolite and connected in parallel with each other, a sorption unit 37 for magnesium separation charged with a weak-acid cation exchanger, a softened water processing unit 38, a mixed concentrate processing unit 39, and an additional column 40 charged with natural zeolite for utilization of potassium solution. Used as the filter 34 can be a clarifying vertical single-chamber, two-chamber or three-chamber filter. Used as the sorption columns 35 and 36 can be industrial ion-exchange filters provided with a device for feeding the solutions from the top and from the bottom of the apparatus and provided with a top and bottom draining devices, respectively. Used as the magnesium separation unit 37 can be ion-exchange counterflow apparatus of the following types: a Higgins contactor (USA), an Asahi contactor (Japan). Used as the softened water processing unit 38 can be an electrodialysis plant combined with a reverse-osmotic plant, multibody evaporators or multistage adiabatic multistage flash-MSF) desalinators, thin-film tubular (multiple effect distillation) evaporators with vertical or horizontal tubes. Used as the mixed concentrate processing unit 39 can be vacuum evaporators combined with crystallizers-collectors provided with a cooling jacket or running-water ponds for solar evaporation also combined with crystallizers-collectors provided with a cooling jacket.

The calcium separation columns 35 and 36 are provided at their top and bottom portions, with assemblies having inlet valves 41, 42 and 43, 44 and outlet valves 45, 46 and 47, 48, respectively.

The softened water processing unit 38 is made as a desalinating module having an inlet 49 and two outlets 50 and 51 for fresh water and secondary brine, respectively.

The outlet 52 of the sorption filter 34 is connected to the inlet valves 41 and 42 of the assemblies at the top portions of the sorption columns for calcium separation 35 and 36, respectively.

The inlet 53 of the sorption unit 37 for magnesium separation is connected to the outlet valves 47 and 48 of the assemblies at the bottom portions of the sorption columns 35 and 36 for calcium separation.

The outlet 51 for the secondary brine flowing from the unit 38 is connected to the inlet valves 43 raid 44 of the assemblies at the bottom portions of the sorption columns 35 and 36 for calcium separation.

The inlet 54 of the mixed concentrate processing unit 39 is connected to the outlet valves 45 and 46 of the assemblies at the top portions of the sorption columns 35 and 36 for calcium separation.

The outlet 55 of the mixed concentrate processing unit 39 is connected to the inlet 56 of the additional column 40, and the outlet 57 of the column 40 is connected to the inlet 58 of the mixed concentrate processing unit 39.

The method according to the invention will become more clear from the description of how plant operates.

The plant operates as follows.

Sea-water is fed to the inlet of the sorption filter 35 where it is subjected to mechanical filtration while being passed through the charge of natural zeolite. The suspension remains in the bed of natural zeolite and periodically, as calmatation of the filter proceeds, is washed away by a reverse, loosening flow of sea-water back to the sea aquatorium. Next the filtered sea-water passes through one of the columns 35 or 36 loaded with artificial modified zeolite on which the sorption of calcium takes place. The columns 35 and 36 are operating simultaneously so that, when one of them is in the mode of sorption, the other column is in the mode of regeneration. The sorption process continues until calcium "break" through the sorption column (35 36), whereupon the columns 35,36 are changed over the mode of sorption to the mode of regeneration, and vice versa, this being effected by automatic shifting of inlet and outlet valves 41–48. The change-over is effected, for instance, in response to a signal from a calcium analyzer (not shown in FIG. 5) mounted in the line connected the outlet 53 of the unit 37 to the outlet valves 45 and 46 of the assemblies at the bottom portion of the sorption columns 35 and 36 for calcium separation.

The operation modes of columns 35 and 36 and the succession of shifting the valves are shown in Table I.

TABLE I

| Cycle | Mode in column 35 | Mode in column 36 | Open valves | Closed valves |
|---|---|---|---|---|
| 1 | sorption | regeneration | 41, 47, 44, 46 | 42, 48, 43, 45 |
| 2 | regeneration | sorption | 42, 48, 43, 45 | 41, 47, 44, 46 |
| 3 | similarly to the 1-st cycle, etc. | | | |

Partially softened sea-water made free of calcium after the columns 35 or 36 at the sorption step flows through the inlet 53 to the magnesium separation unit 37 which is designed in such a manner as to allow to carry out in a parallel mode the processes of magnesium sorption on a carboxylic cation exchanger and regeneration of the cation exchanger by soda solution. In doing so, in the process of the above-mentioned regeneration, a regenerate is produced from a product—magnesium carbonate—is separated.

The sea-water thus softened completely and made of calcium and magnesium is then fed through the inlet 49 to the unit 38 (desalinating module). In the desalination module, fresh water is produced as a finished product removed through the outlet 50, and also secondary brine is produced having a concentration of salts as high as et least 100 g/l, which is removed through the outlet 51. The secondary brine flows continuously, as it is produced, through the outlet 51 and the inlet valves 43 or 44 of the assemblies at the bottom portions of the columns 35 and 36 and used for their regeneration, i.e. for desorption of calcium from the bed of modified zeolite.

The regenerate resulting from desorption of calcium at the steps of modified zeolite regeneration in the columns 35 and 36 and representing a mixed concentrate of calcium, sodium and potassium salts via outlet valves 45 or 46 of the assemblies at the top portions of the columns 35 and 36 flows through the inlet 54 to, the mixed concentrate processing unit 39 where it is subjected to fractional crystallization with a successive separation of the following products: calcium, sodium chloride, sodium sulphate and also a residual brine enriched with potassium.

The brine enriched with potassium flows continuously, as it is produced in the unit 39, through the outlet 55 to the inlet of the additional column 40 with natural zeolite and, while passing therethrough, is converted into sodium-calcium-potassium brine similar in its composition to the mixed concentrate (regenerate) at the outlets from the upper portions of columns 35 and 36 so that it is, therefore, fed together with the above-mentioned mixed concentrate through the inlet 58 to the mixed concentrate processing unit 39. In the process of operation of the additional column 40 the natural zeolite that is inside it is converted into potassium-saturated zeolite which is a chloride-free potassium fertilized of prolonged action. The latter is discharged from the column 40 as a product, and fresh natural zeolites is charged into the above-mentioned column 40 together with the waste substandard natural zeolite formed as the filter 34 of mechanical filtration is operated.

Thus, the plant described above allows, to operate in a regeneratonless mode ("self-regeneration" mode) at the step of separation of calcium from sea-water, and this, in final analysis, leads to substantial savings as compared against conventional plants comprising expensive regeneration units which are to be serviced and also require purchased reagents. Additional savings are related to a plant scheme particularity shown in FIG. 5. The loadings of sorbents used can be decreased substantially in comparison with conventional plants since in the claimed plant the minimum duration of filtering cycles is not limited by technological requirements related to carrying out the regeneration processes in practice. There is no necessity to extend the filtering cycles as dictated by small capacity of modified zeolite. A multiple reduction of the filtering cycle duration will affect, at the final, only the shifting frequency of the inlet and outlet valves 41–48.

Hereinbelow are given specific examples to illustrate various embodiments of the method, according to the invention, from which its advantages will be seen clearly.

EXAMPLE 1

A sorption and electrosorption columns have been prepared with the parameters given in Table II.

TABLE II

| Column No. in order | Column No. in accordance with step No. in FIG. 1 | Column height (cm) | Cross-selection area S (cm$^2$) | Sorbent charge |
| --- | --- | --- | --- | --- |
| 1 | 1 | 60 | 100 | Natural zeolite-clinoptilite in Na$^+$ form |
| 2 | 2 | 50 | 40 | Magnesium-modified zeolite in Na$^+$+form |
| 2' | 2 | 50 | 40 | Magnesium-modified zeolite in Na$^+$+form |
| 3 | 3 | 50 | 10 | Activated carbon modified with ferric hydroxide |
| 3' | 3 | 50 | 10 | Activated carbon modified with ferric hydroxide |
| 4 | 4 | 50 | 40 | Carboxylic cation exchanger KB-4 in Na$^+$ form |
| 4' | 4 | 50 | 40 | Carboxylic cation exchanger KB-4 in Na$^+$ form |
| 5 | 5 | 25 | 20 | Anion exchanger SB-1 in CO$_3^{2-}$ form |
| 5' | 5 | 25 | 20 | Anion exchanger SB-1 in CO$_3^{2-}$ form |
| 6 | 20 | 25 | 20 | Natural zeolite-clinoptilolite in Na$^+$ form |

Columns 1, 2, 2', 4, 4', 5, 5' and 6 were ion-exchange apparatus with a filtering bottom.

Columns 3 and 3' were made from an electrically conductive material and had a cylindrical shape (cathode) with an internal diameter of its base 4 cm, and each of them contains a coaxially arranged rod (cylinder) of an electrically conductive material (anode) with an external diameter of its base being 2 cm. The cylindrical gap between the cathode and anode was loaded with activated carbon having an admixture of 0.1 to 1% ferric hydroxide. A diaphragm passing the solution was laid between the cathode and the electrosorbent bed, direct current having a voltage of 3 V was delivered to the cathode and anode.

b) Passed in succession through the columns 1-2-3-4-5 was sea-water having the following composition: 0.4 g-eq/l NaCl, 0.12 g-eq/l MgCl$_2$+MgSO$_4$, 0.02 g-eq/l CaCl$_2$, 0.01 g-eq KCl, $8 \cdot 10^{-4}$ g-eq/l NaBr and $1 \cdot 10^{-4}$ g-eq/l Na$_3$PO$_3$. The sea-water was passed at a rate of 10 l/hour. The time of its passing was 4 hours.

c) The columns 2, 3, 4 and 5 were disconnected for regeneration, and the sea-water was continued to be passed successively through the columns 1, 2', 3', 4', and 5 at rate of 10 l/hour and then through a laboratory electrodialysis plant assembled from 10 pairs of cation-exchange and anion-exchange membranes having a size of 15×30 cm, with a delivery of common successively to all the cells −12 V. As a result, secondary brine was produced that has a content of salts of 200 g/l at a rate of 1.73 l/hour, and diluate (fresh water) with a content of salts as low as 0.5 g/l at a rate of 8.27 l/hour.

The fresh water was delivered for farther conditioning and use. The secondary brine was delivered for regeneration of zeolite in the column 2 used up at the sorption step in accordance with item "b".

d) Regeneration of artificial zeolite in the column 2 by secondary brine was carried out simultaneously with the sorption softening steps in the columns 1, 2, 3', 4' and 5 and desalination in the electrodialysis plant in accordance with Item "c". The brine was passed at the rate of 8.2 l/hour, and the time of the process was 4 hours.

e) Regeneration or activated carbon used up with respect to bromine was carried out in the column 3 simultaneously with the steps of Items "c" and "d", for which purpose 2.4 l of fresh water were passed through the column 3 after the polarity of connecting electric current from the external source was preliminary changed to the opposite one. The water was passed at the rate of 0.6 l/hour. The time of its passing was 4 hours, whereupon the polarity reversal was repeated again (with the anode potential applied to the electrosorbent), and the column 3 was considered again to be ready for operation.

f) Simultaneously with regeneration of artificial zeolite in accordance with Item "d", and electrosobent, with item "e" regeneration of weak-acid cation exchanger used up at the sorption step in accordance with item "b" was carried out in accordance with item "e". In order to do this, through this column there was passed a solution of the following composition: $Na_2CO_3$ (soda)–3.14 g-eq/l, and $NaHCO_3$ (bicarbonate soda)–0.59 g-eq/l. In total, the concentration of solution in terms of sodium was 3.73 g-ion/l, the molar ratio of carbonate and bicarbonate was 1:0.376, and pH of the solution was 9.6. Hereinafter, the mixture of this composition is named as "AL". The rate at which the "AL" was passed, was 3 l/hour, and the time during which it was passed, was 4 hours. As a result, there were produced 12 liters of concentrated filtrate.

g) Simultaneously with the steps according to Items "d", "e" and "f", the column 5 used up with respect to boron was regenerated, for which purpose 2.4 liters of 2H solution of sodium carbonate ($Na_2CO_3$) were passed through the column at a rate of 0.6 l/hour. The time during which it was passed, was 4 hours. As a result, a filtrate was produced that was concentrated in terms of boron.

h) The columns 2, 3, 4 and 5 were changed over to sorption, and the sea-water began to be passed according to the scheme 1-2-3-4-5. The columns 2', 3', 4', and 5' were changed over to regeneration, and all the processes were repeated in accordance with Items "b", "c", "d", "e" and "g". Every 2 cycles of sorption according to scheme 1-2-3-4-5, there were carried out loosening of the column 1 and removal of mechanical suspension by the supply of a reverse flow of sea-water at a rate of 50 l/hour for as long as 2 minutes. The flow was discharged or directed to the aquatorium (source) of sea-water.

i) After each cycle of modified zeolite regeneration in accordance with Items "c" and "d", there were produced 6.92 liters of concentrate which was a solution supersaturated with calcium sulfate, from which, within one hour, spontaneous crystallization of gypsum—$CaSO_4.2H_2O$—begins. The concentrate received after each cycle was evaporated 1.2 times in a (laboratory) rotor evaporator at a temperature of 50° C. under a pressure of 0.05 to 0.10 kg/cm², or under the influence of infrared lamps simulating solar evaporation until the state of saturation is reached in terms of sodium chloride (330 g/l and the solution density of 1.9 g/cm²). The deposit of sodium sulphate (gypsum) was separated and dried at a temperature of 100° C. In total 54.5 g $CaSO_4.2H_2O$ were produced in terms of dry salt per cycle (4 hours) in carrying out the process of complex processing of sea-water.

j) The bromine concentrate produced in accordance with Item "e" after the electrosorber (a total of 2.4 liters per cycle was evaporated in the rotor evaporator under a pressure of 0.1 atm at a temperature of 40° C. for as long as 0.5 hour. As a result, there was produced a dry substance, $MgBr_2.6H_2O$. In total, 3.5 g of this substance (28 mg-equivalents in terms of bromine) were produced per cycle which was 4 hours long.

k) The concentrate which was a supersaturated solution of magnesium carbonate, after the column was aged for as long as 1 hour, during which time there was going on spontaneous crystallization of a slightly soluble compound, $MgCo_3.3H_2O$, with the size of crystals ranging from 0.3 to 1 mm. The deposit was filtered off, and the solution of $Na_2CO_3.NaHCO_3$ with a residual content of $MG^+$ in the amount of 0.05 g-eq/l was collected into a vessel in order to use it in the next cycle of regeneration, upon afterstrengthening thereof, with the mixture "AL" taken in an amount exactly equivalent to the quantity of described magnesium (4.5 g-eq in terms of $Na^+$). After the deposit was separated, it was dried up at a temperature of 100° C. In total, during a cycle there were produced as much as 280 g of the product, $MgCO_3.3H_2O$, (4 g-eq in terms of magnesium) having a purity of at least 99.5%. The duration of all the steps according to this item is 4 hours.

l) The boron concentrate produced in accordance with Item "g" (a total of 2.4 l) was subjected to electrolysis in an electrochemical cell having a volume of 3 l and provided with titanium anodes coated with ruthenic oxides, with the distance between the parallelly disposed alternating anode and cathode being 1 cm and the voltage across each adjacent couple of electrodes being 33 V. The time of electrolysis was 1 hour. The deposit of sodium perborate—$Na_2B_2O_4$—separated in the electrolyzer was filtered off and dried at a temperature of 60° C. for as long as 2 to 4 hours. In total, 1.8 g of sodium perborate were produced per cycle.

The solution of $Na_2CO_3$ after filtration was afterstrengthened with soda until a concentration of 3 g-eq/l was reached in order to use it in the next regeneration cycle.

m) The filtrate after separation of the gypsum deposit (1 l/hour in terms of average flow) was subjected to a further 6.7-fold evaporation in order to separate common salt NaCl. Evaporation was carried out until a state was reached that was close to saturation with sodium sulphate, at a temperature of 50° C. (till the total flow of liquid brines is 150 m/hour). The deposit of sodium chloride was separated and dried up at a temperature of to 120° C. In total, during the cycle (4 hours) there were produced 1100 g NaCl, including: with admixture of calcium no more thin 0.35%, with admixture of sodium sulphate no more than 1% and admixture of sodium bromide no more than 0.35%.

The filtrate after separation of sodium chloride (with a concentration of salts being 400 g/l) was cooled down to a temperature of 5° and aged for as long as 1 hour, with a resulting precipitation of sodium sulphate in the form of sodium sulphate decahydrate $Na_2SO_4.10H_2O$. In the process of sodium sulphate crystallization, the total concentration of salts was decreasing in the residual bitter brines down to 250 g/l. The deposit was separated by filtration in cold and dried first by blowing air through the filter and then at a temperature of 80° C. In total 46 g of sodium sulphate decahydrate were produced per cycle with an admixture or NaCl of no more than 5%.

o) The bitter brines resulting from separation of sodium sulphate and enriched with potassium, which had a total flow of 0.13 l/hour and a concentration of 250 g/l, were passed through an additional column with clinoptilolite having parameters l=25 cm and S=20 cm² (No. 6 in Table II) and designed for sorption separation of potassium. The resulting filtrate (130 ml/hour) $Na^{-+}$—a brine having its composition close to the composition of secondary brine resulting from electrolysis was added to the regeneration solution for modified zeolite in the columns 3 and 4.

p) Every 10 cycles of carrying out the process, the column with clinoptiolite (No. 6 in Table II) was treated with bitter brines in accordance with Item "1", saturated with potassium and replaced by a fresh charge of clinoptilolite in Na$^+$ form (said charge comprising the zeolite wastes from the step of mechanical filtration and fresh natural zeolite). The resulting zeolite composite is a chlorine-free potassium fertilizer of prolonged action and can be used in agrochemistry. The process was repeated in accordance with items "a" to "p".

Thus, in carrying out the steps according to Items "a" to "p", a complex nonwaste processing of sea-water is ensured so that useful products are produced, such as; $H_2O$, $MgCO_3 \cdot 3H_2O$, $NaCl$, $Na_2SO_4$, $CaSO_4$ and K$^+$—clinoptilolite, $MgBr_2$ and $Na_2B_2O_4(OH)_4$.

EXAMPLE 2

The process was carried out like in example 1, according with Items "a" to "p", except that during the desalination step according to Item "c" electrodialysis was carried out so that common voltage of 9 V was supplied successively to all the cells. In doing so, a concentrate (secondary brine) was produced with a content of salts as high as 180 g/l, and a diluate was produced with a content of salts as low as 5 g/1. The diluate was passed through a laboratory reverse-osmosis plant having a total area of hyperfiltrating membranes as large as 20,000 cm$^2$ under a pressure of 10 cm$^2$ so that fresh water was produced having a content of salts as low as 0.5 g/l and also secondary brine was produced having a content of salts as high as 35 g/l. The latter was continuously returned to the inlet of the electrodialyzer in accordance with a scheme shown in FIG. 2. In doing so, the total productivity of the scheme in the terms of fresh water was 8.08 l/hour. The secondary brine was subjected to processing in accordance with Items "c", "i", and "m" to "p".

EXAMPLE 3

The process was carried out, like in example 1, in accordance with Items "a" to "p", except that the waste sea-water containing no magnesium and calcium salts after the columns 1-2-4 or 1-3-5 with a flow rate of 10 l/hour was subjected to evaporation in a distiller (FIG. 3) provided with a cooler and a collector for water at a temperature of 110° C. for as long as 1 hour until a residual flow of secondary brine was obtained having a rate of 1.8 l/hour and a concentration of salts as high as 210 g/l. In this case, 8.2 l/hour of fresh water were produced with a content of salts as low as 0.24 g/l.

The secondary brine was subjected to processing in accordance with Items "c", "i", and "m" to "p" of example 1.

EXAMPLE 4

The process was carried out, like in example 1, except that the waste sea-water having a flow rate of 10 l/hour was passed through a laboratory membrane apparatus (FIG. 4) consisting of ten identical cells separated by a hydrophobic microporous membrane with the following parameters: a half-cell volume of 500 ml, a membrane area of 1000 cm$^2$, and a differential temperature in the half-cells –40° C. The waste sea-water was passed through a hot half-cell (60° C.) at a rate of 30 l/hour in circulation mode, with fresh water having a content of salts as low as 0.01 g/l taken off from the cold half-cell at rate of 8.45 l/hour. In this case, 1.55 l/hour of secondary brine were obtained with a total content of salts as high as 225 g/l. The secondary brine was subjected to further precessing in accordance with Items "c", "i", and "m" to "p" of example 1.

The method and plant for complex processing of seawater made according to the invention allowed, owning to the use of the combination of steps described herein above and conditions of their implementation and also their conjunction with each other, to ensure ecological safety due to creation of a closed-circuit scheme without liquid effluents and solid wastes, to reduce the cost of the resulting fresh water due to a simultaneous production of commodity products in the form of sodium, magnesium, potassium and calcium salts, to improve quality of the resulting fresh water due to removal of bromine and boron compounds from the source sea-water, and to reduce the cost of complex processing of sea-water due to creation of a "self-regenerating scheme" of calcium separation, which does not require the use of any delivered reagents and allows to reduce many times the charges of sorbents used each time.

We claim:

1. A method for processing seawater comprising the following steps:
   (a) filtering the seawater by passing the seawater through mechanical filtering means for separating the seawater into a suspension and a first filtrate whereby to obtain the suspension and the first filtrate;
   (b) passing the first filtrate through a zeolite in sodium form that has been treated with magnesium to enhance a selectivity of the zeolite for ion exchange of calcium and magnesium whereby to remove calcium from the filtrate so as to obtain partially softened seawater and a zeolite enriched in calcium;
   (c) passing said partially softened seawater through a weak-acid cation exchanger to remove magnesium from the partially softened seawater whereby to obtain further softened seawater and a weak-acid cation exchanger enriched in magnesium;
   (d) desalinating the further softened seawater to obtain fresh water and a secondary brine comprising salt in a concentration of at least 100 g/liter;
   (e) passing said secondary brine through the zeolite enriched in calcium to obtain a regenerated zeolite and a mixed concentrate comprising calcium, sodium and potassium salts;
   (f) passing a solution of sodium carbonate through the weak-acid cation exchanger enriched in magnesium to obtain a regenerated weak-acid cation exchanger and a resultant solution supersaturated with magnesium carbonate that settles upon standing;
   (g) repeating at least steps (a) through (e) with the first filtrate being passed through the regenerated zeolite in a repeated step (b) and with the partially softened seawater being passed through the regenerated weak-acid cation exchanger in a repeated step (c).

2. The method as claimed in claim 1, wherein the mechanical filtering means comprises natural zeolite whereby the filtering in step (a) results in formation of zeolite wastes.

3. The method as claimed in claim 2 comprising treating the mixed concentrate obtained in step (e) by evaporation and fractional crystallization so as to form calcium sulfate, sodium chloride and a brine enriched in sodium sulfate.

4. The method as claimed in claim 3 comprising cooling said brine enriched in sodium sulfate and filtering sodium sulfate therefrom whereby to obtain a deposit of sodium sulfate and a potassium brine.

5. The method as claimed in claim 4 comprising passing said potassium brine through said zeolite wastes to form a potassium form of zeolite and a residual brine, and mixing said residual brine with said mixed concentrate and treating the mixture by evaporation and fractional crystallization to form calcium sulfate, sodium chloride and the brine enriched in sodium sulfate.

6. The method as claimed in claim 5 comprising adding natural zeolite to the zeolite wastes.

7. The method as claimed in claim 1 comprising treating the mixed concentrate obtained in step (e) by evaporation and fractional crystallization so as to form calcium sulfate, sodium chloride and a brine enriched in sodium sulfate.

8. The method as claimed in claim 7 comprising cooling said brine enriched in sodium sulfate and filtering sodium sulfate therefrom whereby to obtain a deposit of sodium sulfate and a potassium brine.

9. The method as claimed in claim 8 comprising cooling said brine enriched in sodium sulfate to a temperature below 10° C.

10. The method as claimed in claim 7 comprising supplying solar energy for the evaporation and fractional crystallization of the mixed concentrate.

11. The method as claimed in claim 1 comprising, after step (b), passing the partially softened seawater through activated carbon treated with metal hydroxides while maintaining an anode potential on said activated carbon whereby to remove bromine from said partially softened seawater, subsequently regenerating said activated carbon by passing fresh water therethrough while maintaining a cathode potential on said activated carbon whereby to obtain regenerated activated carbon and a regenerate enriched in bromine, and passing the partially softened seawater obtained in step (b) through the regenerated activated carbon to remove bromine therefrom.

12. The method as claimed in claim 11 comprising evaporating the regenerate enriched in bromine to form a concentrate of magnesium bromide.

13. The method as claimed in claim 11, wherein the metal hydroxides comprise a mixture of at least two hydroxides of the same metal with different oxidation states, said mixture being selected from the group consisting of ferrous hydroxide (II) and ferric hydroxide (III), chromous hydroxide (II) and chromic hydroxide (III), and titanium hydroxides (II) and (IV).

14. The method as claimed in claim 1 comprising, after step (c), passing the further softened seawater obtained in step (c) through a weak-base anion exchanger in carbonate form whereby boron is removed from the further softened seawater and the weak-base anion exchanger is enriched in boron, subsequently passing a solution of sodium carbonate through the weak-base anion exchanger enriched in boron to form a regenerate enriched in boron and a regenerated weak-base anion exchanger, and subsequently passing further softened seawater obtained in step (c) through the regenerated weak-base anion exchanger.

15. The method as claimed in claim 14 comprising electrolyzing the regenerate enriched in boron to form a suspension of sodium perborate.

16. The method as claimed in claim 15 comprising filtering the suspension of sodium perborate to form a deposit of sodium perborate and a filtrate of sodium carbonate and drying the deposit to form solid sodium perborate.

17. The method as claimed in claim 1, wherein the solution of sodium carbonate is passed through the weak-acid cation exchanger enriched in magnesium at a first temperature to obtain the regenerated weak-acid cation exchanger and said resultant solution is thereafter maintained at a higher temperature for a time sufficient for the magnesium carbonate to settle.

18. The method as claimed in claim 17, wherein the first temperature is below 25° C. and the higher temperature is above 35° C.

19. The method as claimed in claim 1 comprising allowing said suspersaturated solution to settle to form a suspension of magnesium carbonate and filtering and drying the suspension of magnesium carbonate to obtain solid magnesium carbonate.

20. The method as claimed in claim 1, wherein the desalinating in step (d) comprises electrodialyzing the further softened seawater to form a further brine having a concentration of salts from 100 to 250 g/l and a first diluate; separating the first diluate into fresh water and an intermediate brine by reverse osmosis; electrodialyzing the intermediate brine to form a concentrated brine having a concentration of salts from 100 to 250 g/l and a second diluate; and mixing the first and second diluates.

21. The method as claimed in claim 1, wherein the desalinating in step (d) comprises a thermal distillation of the further softened seawater to form a further brine having a concentration of salts from 100 to 200 g/l and fresh water.

22. The method as claimed in claim 1, wherein the desalinating in step (d) comprises membrane distillation of the further softened seawater to form a further brine having a concentration of salts from 100 to 300 g/l and fresh water.

23. The method as claimed in claim 1, wherein the treated zeolite is an artificial zeolite in sodium form that has been successively treated with a 0.05 to 0.5M solution of magnesium chloride and a 2 to 3M solution of sodium chloride.

24. The method as claimed in claim 1, wherein the treated zeolite is provided in a plurality of columns with the first filtrate alternately passing through the treated zeolite or the regenerated zeolite in first and second of said columns whereby to form the zeolite enriched in calcium alternately in said first and second columns, said secondary brine being passed through the zeolite enriched in calcium in the second column while the first filtrate is passed through the first column, said secondary brine being passed through the zeolite enriched with calcium in the first column while the first filtrate is passed through the second column.

* * * * *